United States Patent
Pruett et al.

(10) Patent No.: US 6,728,833 B2
(45) Date of Patent: Apr. 27, 2004

(54) UPGRADING FIRMWARE ON DISKS OF THE RAID STORAGE SYSTEM WITHOUT DEACTIVATING THE SERVER

(75) Inventors: Gregory Brian Pruett, Raleigh, NC (US); David B. Rhoades, Apex, NC (US); Linda Ann Riedle, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 10/085,401

(22) Filed: Feb. 28, 2002

(65) Prior Publication Data

US 2003/0163640 A1 Aug. 28, 2003

(51) Int. Cl.$^7$ .............................................. G06F 12/00
(52) U.S. Cl. ...................... 711/114; 711/112; 711/161; 711/162; 714/6
(58) Field of Search ................................ 711/114, 112, 711/161, 162; 714/6

(56) References Cited

U.S. PATENT DOCUMENTS

| | | | |
|---|---|---|---|
| 6,058,489 A | 5/2000 | Schultz et al. ................. | 714/7 |
| 6,105,089 A * | 8/2000 | Chari et al. .................. | 710/302 |
| 2002/0166027 A1 * | 11/2002 | Shirasawa et al. .......... | 711/114 |
| 2003/0212856 A1 * | 11/2003 | Nichols ....................... | 711/114 |

* cited by examiner

Primary Examiner—Kevin Verbrugge
Assistant Examiner—Mehdi Namazi
(74) Attorney, Agent, or Firm—Winstead Sechrist & Minick

(57) ABSTRACT

A method, system and computer program product for updating firmware in a disk in a disk array in a RAID storage system without deactivating a server coupled to the disk array. Upon selecting the disk whose firmware is to be updated, the selected disk may enter a degrade mode of operation where a RAID controller coupled to the RAID storage system may prevent requests from reaching the selected disk thereby suppressing activity on the selected disk to allow the firmware to be updated. During the updating of the firmware, any stripes updated may be tracked. Upon completion of the firmware update, the stripe units in the selected disk associated with the stripes updated may be rebuilt. In this manner, firmware may be updated on a disk in a RAID storage system without deactivating the server thereby allowing the server to continuously stay active.

81 Claims, 12 Drawing Sheets

UPGRADING FIRMWARE ON DISKS OF THE RAID STORAGE SYSTEM WITHOUT DEACTIVATING THE SERVER

TECHNICAL FIELD

The present invention relates to the field of a Redundant Array of Independent Disks (RAID) storage system, and more particularly to upgrading firmware on the disks in the RAID without deactivating the server coupled to the RAID storage system.

BACKGROUND INFORMATION

As the performance of microprocessor and semiconductor memory technology improves, there is a need for improved data storage systems with comparable performance enhancements. Additionally, in enhancing the performance of data storage systems, there is a need for improved reliability of data stored. In 1988, a paper was published by Patterson, Gibson, Katz, A Case for Redundant Arrays of Independent Disks (RAID), International Conference on Management of Data, pgs. 109–116, June 1988. This paper laid the foundation for the use of redundant arrays of independent disks that would not only improve the data transfer rate and data I/O rate over a comparable single disk access, but would also provide error correction at a lower cost in data storage systems.

RAID may include an array of disks which may be coupled to a network server. The server, e.g., file server, database server, web server, may be configured to receive a stream of requests (Input/Output (I/O) requests) from clients in a network system to read from or write to particular disks in the RAID. The I/O requests may also be issued from an application within the server. The server may comprise a RAID controller which may be a hardware and/or software tool for providing an interface between the server and the array of disks. The server may forward the I/O requests to the RAID controller which may retrieve or store the requested data. Typically, the RAID controller manages the array of disks for storage and retrieval and views the disks of the RAID separately. The disks included in the array may be any type of data storage systems which may be controlled by the RAID controller when grouped in the array.

The RAID controller may typically be configured to access the array of disks as defined by a particular "RAID level." The RAID level may specify how the data is distributed across the disk drives and how error correction is accomplished. In the paper noted above, the authors describe five RAID levels (RAID Level 1-RAID Level 5). Since the publication of the paper, additional RAID levels have been designated.

RAID levels are typically distinguished by the benefits included. Three key benefits which may be included in a RAID level are fault tolerance, data availability and high performance. Fault tolerance may typically be achieved through an error correction method which ensures that information can be reconstructed in the event of a disk failure. Data availability may allow the data array to continue to operate with a failed component. Typically, data availability may be achieved through a method of redundancy. Finally, high performance may typically be achieved by simultaneous access to multiple disk drives which results in faster I/O and data transfer requests.

Error correction may be accomplished, in many RAID levels, by utilizing additional parity data stored with the original data. Parity data may be utilized to recover lost data due to disk failure. Parity data may typically be stored on one or more disks dedicated for error correction only or distributed over all of the disks within an array.

By the method of redundancy, data may be stored in multiple disks of the array. Redundancy is a benefit in that redundant data allows the storage system to continue to operate with a failed component while data is being replaced through the error correction method. Additionally, redundant data is more beneficial than backup data because back-up data is typically outdated when needed whereas redundant data is current when needed.

In many RAID levels, redundancy may be incorporated through data interleaving which distributes the data over all of the data disks in the array. Data interleaving is usually in the form of data "striping" in which data to be stored is broken down into blocks called "stripe units" which are then distributed across the array of disks. Stripe units are typically predefined as a bit, byte, block or other unit. Stripe units are further broken into a plurality of sectors where all sectors are an equivalent predefined size. A "stripe" is a group of corresponding stripe units, one stripe unit from each disk in the array. Thus, "stripe size" is equal to the size of a stripe unit times the number of data disks in the array.

In an example, RAID level 5 utilizes data interleaving by striping data across all disks and provides for error correction by distributing parity data across all disks. For each stripe, all stripe units are logically combined with each of the other stripe units to calculate parity for the stripe. Logical combination may be accomplished by an exclusive or (XOR) of the stripe units. For N physical drives, N−1 of the physical drives will receive a stripe unit for the stripe and the Nth physical drive will receive the parity for the stripe. For each stripe, the physical drive receiving the parity data rotates such that all parity data is not contained on a single disk.

Disk arrays may be configured to include logical drives which divide the physical drives in the disk array into logical components. Each logical drive may include a cross section of each of the physical drives and may be assigned a RAID level.

Each disk in the disk array of a RAID may store firmware where firmware may refer to software that may be burned into a memory chip, e.g., Read-Only Memory (ROM), Programmable ROM (PROM), Erasable PROM (EPROM), Electrical EPROM (EEPROM) or into the hard drive. Typically, the firmware stored on the disk in the disk array may be configured to perform functions such as sector re-mapping, monitoring the disk for failures, etc.

In order to update the firmware stored on a disk in the disk array, all activity on that disk must become inactive. If the disk receives a request to read from or write to that disk during the process of upgrading the firmware, the disk may become inoperative either permanently or temporarily. Subsequently, the server coupled to the RAID comprising the disk with the firmware to be updated must be deactivated thereby assuring that the disk does not receive any I/O requests.

However, some servers such as mission critical servers may be required to stay active continuously. It would therefore be desirable to be able to update firmware on the disks in a RAID storage system without deactivating the server coupled to the RAID thereby allowing the server to continuously stay active.

SUMMARY

The problems outlined above may at least in part be solved in some embodiments by selecting a disk in a disk array of the RAID storage system to have its firmware updated. The selected disk may enter a degrade mode of operation where the RAID controller coupled to the RAID may prevent requests from reaching the selected disk thereby suppressing activity on the selected disk to allow the firmware to be updated. During the updating of the firmware, any stripes updated may be tracked. Upon completion of the firmware update, the stripe units in the selected disk associated with stripes updated may be rebuilt. In this manner, firmware may be updated on a disk in a RAID storage system without deactivating the server coupled to the RAID storage system thereby allowing the server to continuously stay active.

In one embodiment of the present invention, a method for updating firmware on a disk in a RAID storage system implementing a RAID level one system without deactivating a server coupled to the RAID storage system may comprise the step of selecting a particular physical disk in the RAID storage system to update the firmware in that particular disk. The selected disk as well as the associated logical drives may enter a degrade mode of operation. In the degrade mode of operation, a RAID controller, providing an interface between the server and the RAID storage system, may suppress particular activities, e.g., recovery actions, hot spare kickin, from occurring on the selected disk as well as prevent requests, e.g., read/write requests issued from a client, hot swap queries, from reaching the selected disk. By suppressing particular activities from occurring on the selected disk and preventing requests from reaching the selected disk, activity on the selected disk may become inactive thereby allowing the firmware on the selected disk to be updated.

The firmware on the selected disk may then be updated. During the updating of the firmware, the following may occur.

A determination may be made as to whether the RAID controller received any read requests for the stripe units in the selected disk. If the RAID controller received a request to read data stored in a stripe unit in the selected disk, then the RAID controller may retrieve and transmit the requested data stored in the stripe unit that mirrors the stripe unit containing the requested data.

If the RAID controller did not receive a request to read data stored in the stripe unit in the selected disk, then a determination may be made as to whether the RAID controller received any write requests for the stripe units in the selected disk. Furthermore, upon transmitting the requested data stored in the stripe unit that mirrors the stripe unit containing the requested data, a determination may be made as to whether the RAID controller received any write requests for the stripe units in the selected disk.

If the RAID controller did not receive any write requests for the stripe units in the selected disk, then a determination may be made as to whether the updating of the firmware is complete as discussed further below.

If the RAID controller received any write requests for the stripe units in the selected disk, then the RAID controller may write the updated data in the stripe unit that mirrors the stripe unit containing the data that was updated. A copy of the updated data may be stored for backup purposes.

The stripe associated with the stripe units in the selected disk whose data was changed may be tracked. In one embodiment, the stripes associated with the stripe units in the selected disk whose data was changed may be tracked in a table stored in a non-volatile memory of the RAID controller.

A determination may then be made as to whether the updating of the firmware on the selected disk is completed. If the updating of the firmware is not completed, then a determination may be made as to whether the RAID controller received any read requests for the stripe unit in the selected disk. Upon completion of the firmware being updated on the selected disk, the stripe units in the selected disk associated with any stripes to be updated may be rebuilt as described further below.

If the updating of the firmware is complete, then a determination may be made as to whether any stripes were updated. If there were no stripes updated, then there is no need to rebuild any stripe units in the selected disk.

If there were stripes updated, then a stripe unit associated with a stripe updated may be rebuilt. In one embodiment, the stripe units in the selected disk associated with stripes that have been updated may be rebuilt stripe by stripe updated starting from the top stripe that was updated to the bottom stripe, if any, that was updated. In one embodiment, the stripe unit associated with a stripe updated may be rebuilt by copying data in the stripe unit that mirrors the stripe unit to be rebuilt and storing that data in the stripe unit to be rebuilt.

Each stripe associated with the stripe unit rebuilt may be tracked. A determination may then be made as to whether the RAID controller received a write request for a stripe unit rebuilt in the selected disk prior to completing the rebuilding of all stripe units required to be rebuilt.

If the RAID controller did not receive a write request for a stripe unit rebuilt in the selected disk prior to completing the rebuilding of all stripe units required to be rebuilt, then a determination may be made as to whether another disk in the disk array of the RAID storage system has become inoperative during the process of rebuilding the stripe units in the selected disk required to be rebuilt as discussed further below.

If the RAID controller received a write request for a stripe unit rebuilt in the selected disk prior to completing the rebuilding of all stripe units required to be rebuilt, then the updated data may be written in both the stripe unit rebuilt in the selected disk and in the stripe unit that mirrors the stripe unit rebuilt.

A determination may then be made as to whether another disk in the disk array of the RAID storage system has become inoperative during the process of rebuilding the stripe units in the selected disk required to be rebuilt.

If another disk in the disk array of the RAID storage system does not become inoperative during the process of rebuilding the stripe units in the selected disk required to be rebuilt, then a determination may be made as to whether the rebuilding of the stripe units whose data has changed has been completed as discussed further below.

If another disk in the disk array of the RAID storage system has become inoperative during the process of rebuilding the stripe units in the selected disk required to be rebuilt, then the stripe units in the selected disk required to be rebuilt may be rebuilt using a copy of the updated data stored for backup purposes.

A determination may be made as to whether the rebuilding of the stripe units whose data has changed has been completed. If not, then the next stripe unit required to be rebuilt may be rebuilt. If the rebuilding of the stripe units in the selected disk whose data has changed has been completed, then the method may be terminated.

It is noted that even though the above method describes a method for updating firmware on a disk in the RAID storage system implementing a RAID level one system without deactivating the RAID controller that the principles described in the above method may be applicable to any redundant RAID level. It is further noted that a person of ordinary skill would be capable of applying the principles taught in the above method to any redundant RAID level.

In another embodiment of the present invention, a method for updating firmware on a disk in a RAID storage system implementing a RAID level five system without deactivating a RAID controller coupled to the RAID storage system may comprise the step of selecting a particular physical disk in the RAID storage system implementing a RAID level five system to update the firmware in that particular disk.

The selected disk as well as the associated logical drives may enter a degrade mode of operation. In the degrade mode of operation, the RAID controller may suppress particular activities, e.g., recovery actions, hot spare kickin, from occurring on the selected disk as well as prevent requests, e.g., read/write requests issued from a client, hot swap queries, from reaching the selected disk. By suppressing particular activities from occurring on the selected disk and preventing requests from reaching the selected disk, activity on the selected disk may become inactive thereby allowing the firmware on the selected disk to be updated.

The firmware on the selected disk may be updated. During the updating of the firmware on the selected disk, the following may occur.

A determination may be made as to whether the RAID controller received any read requests for the stripe units in the selected disk. If the RAID controller received a request to read data stored in a stripe unit in the selected disk, then the RAID controller may perform a logical calculation on data located in other stripe units associated with the stripe unit containing the data requested. The resulting data may then be transmitted to the requesting client.

If the RAID controller did not receive a request to read data stored in the stripe unit in the selected disk, then a determination may be made as to whether the RAID controller received any write requests for the stripe units in the selected disk. Furthermore, upon transmitting the requested data, a determination may be made as to whether the RAID controller received any write requests for the stripe units in the selected disk.

If the RAID controller did not receive any write requests for the stripe units in the selected disk, then a determination may be made as to whether the updating of the firmware is complete as discussed further below.

If the RAID controller received any write requests for the stripe units in the selected disk, then the RAID controller may generate a new parity for the stripe associated with the stripe unit containing outdated data. A new parity for the stripe associated with the stripe unit containing outdated data may be generated so that the updated data may replace the outdated data as explained further below.

In one embodiment, a new parity may be generated by performing a logical operation on the data to be written along with the data stored in the other stripe units except the stripe unit storing the parity data to be updated and the stripe unit of the selected disk whose firmware is being updated. The updated parity may then replace the older parity associated with the stripe updated. A copy of the updated data, i.e., the data requested to be written in the stripe units in the selected disk, may be stored for backup purposes.

The stripe associated with the stripe unit in the selected disk whose data was changed may be tracked. In one embodiment, the stripes associated with the stripe units in the selected disk whose data was changed may be tracked in a table stored in a non-volatile memory of the RAID controller.

A determination may be made if the updating of the firmware on the selected disk is completed. If the updating of the firmware is not completed, then a determination may be made as to whether the RAID controller received any read requests for the stripe units in the selected disk. Upon completion of the firmware being updated on the selected disk, the stripe units in the selected disk associated with any stripes to be updated may be rebuilt as described further below.

If the updating of the firmware is complete, then a determination may be made as to whether any stripes were updated. If there were no stripes updated, then there is no need to rebuild any stripe units in the selected disk.

If there were stripes updated, then a stripe unit associated with a stripe updated may be rebuilt. In one embodiment, the stripe units in the selected disk associated with stripes that have been updated may be rebuilt stripe by stripe updated starting from the top stripe that was updated to the bottom stripe, if any, that was updated. In one embodiment, the stripe unit associated with a stripe updated may be rebuilt by performing a logical calculation on data located in other stripe units of the stripe associated with the stripe unit containing the outdated data. The resulting data may then be inserted in the stripe unit to be rebuilt.

A determination may then be made as to whether another disk in the disk array of the RAID storage system has become inoperative during the process of rebuilding the stripe units in the selected disk required to be rebuilt.

If another disk in the disk array of the RAID storage system does not become inoperative during the process of rebuilding the stripe units in the selected disk required to be rebuilt, then a determination may be made as to whether the rebuilding of the stripe units whose data has changed has been completed as discussed further below.

If another disk in the disk array of the RAID storage system has become inoperative during the process of rebuilding the stripe units in the selected disk required to be rebuilt, then the stripe units in the selected disk required to be rebuilt may be rebuilt using a copy of the updated data stored for backup purposes.

A determination may then be made as to whether the rebuilding of the stripe units whose data has changed has been completed. If not, then the next stripe unit required to be rebuilt may be rebuilt. If the rebuilding of the stripe units in the selected disk whose data has changed has been completed, then the method may be terminated.

It is noted that even though the above method describes a method for updating firmware on a disk in the RAID storage system implementing a RAID level five system without deactivating the RAID controller that the principles described in the above method may be applicable to any redundant RAID level. It is further noted that a person of ordinary skill would be capable of applying the principles taught in the above method to any redundant RAID level.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

It is noted that even though the following describes the present invention implementing either a RAID level one or a RAID level five implementation, the present invention may be implemented using any redundant RAID level. It is further noted that a person of ordinary skill in the art would be capable of applying the principles taught in the figures and description describing the updating of the firmware on a disk in the RAID storage system without deactivating the server coupled to the RAID storage system implementing either a RAID level one or a RAID level five to any redundant RAID level.

Figure 1:
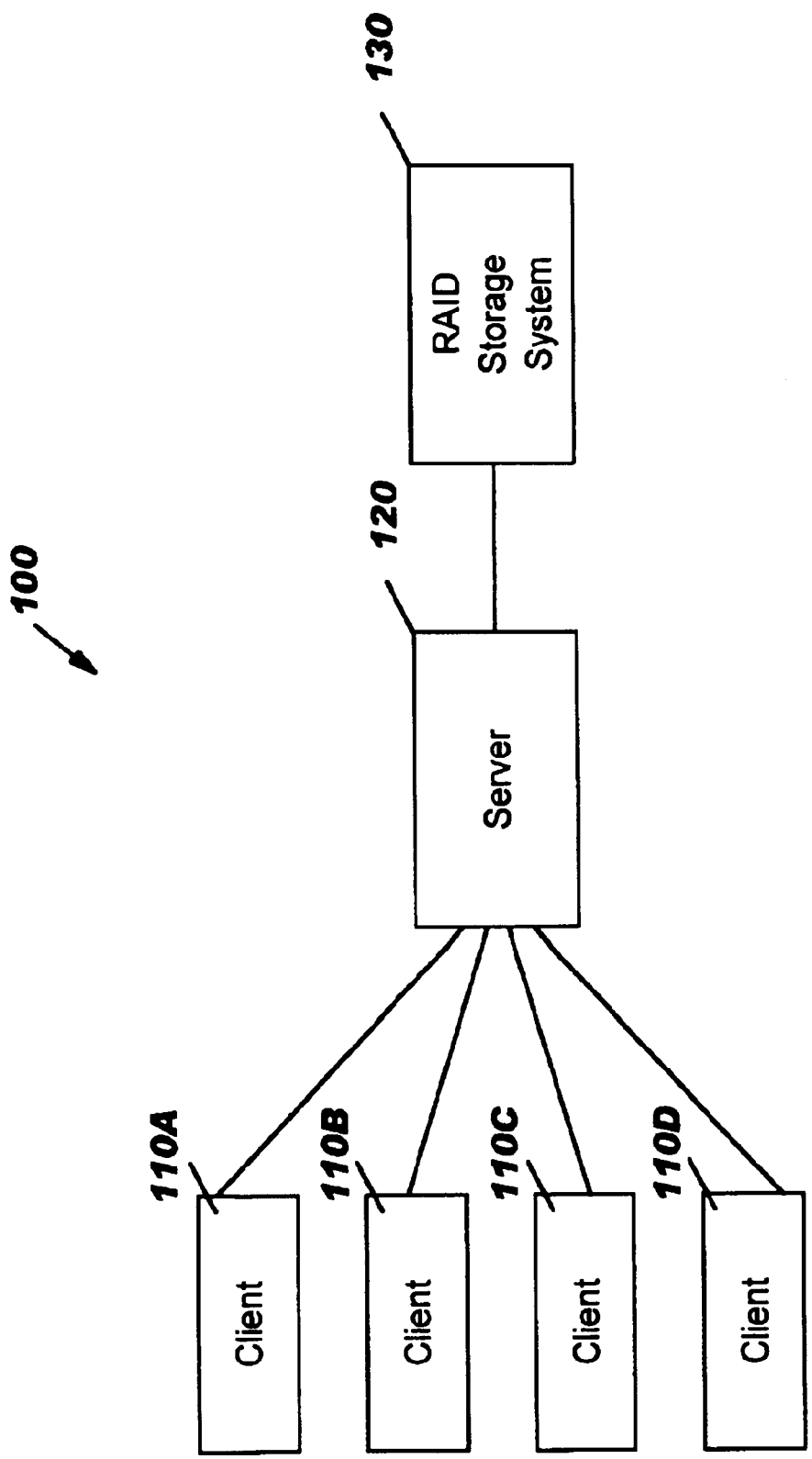
FIG. 1 illustrates a network system configured in accordance with the present invention.

FIG. 1—Network System

FIG. 1 illustrates one embodiment of the present invention of a network system 100. Network system 100 may comprise one or more clients 110A–D coupled to a server 120, e.g., file server, database server, web server. Server 120 may be coupled to a Redundant Array of Independent Disks (RAID) storage system 130. RAID storage system 130 may comprise an array of physical disks as explained in greater detail in conjunction with FIGS. 5 and 7. Clients 110A–D may collectively or individually be referred to as clients 110 or client 110, respectively. Each client 110 may be configured to issue requests, e.g., read/write requests, to server 120 to read from or write to a particular disk in RAID storage system 130. A more detailed description of client 110 is provided below in conjunction with FIG. 2. Server 120 may be configured to forward the requests to a RAID controller to either retrieve from the requested disk in RAID storage system 130 the requested information or store in the requested disk in RAID storage system 130 the requested information. A more detailed description of server 120 is provided further below in conjunction with FIG. 3. It is noted that system 100 may comprise any number of clients 110 and servers 120 and that FIG. 1 is illustrative. It is further noted that in another embodiment, system 100 may only comprise server 120 coupled to RAID storage system 130 where an application in server 120 instead of client 110 generates requests, e.g., read/write requests, to read from or write to a particular disk in RAID storage system 130. It is further noted that network system 100 may be any type of system such as a file system or a database system and that FIG. 1 is not to be limited in scope to any one particular embodiment.

FIG. 2—Client

Figure 2:
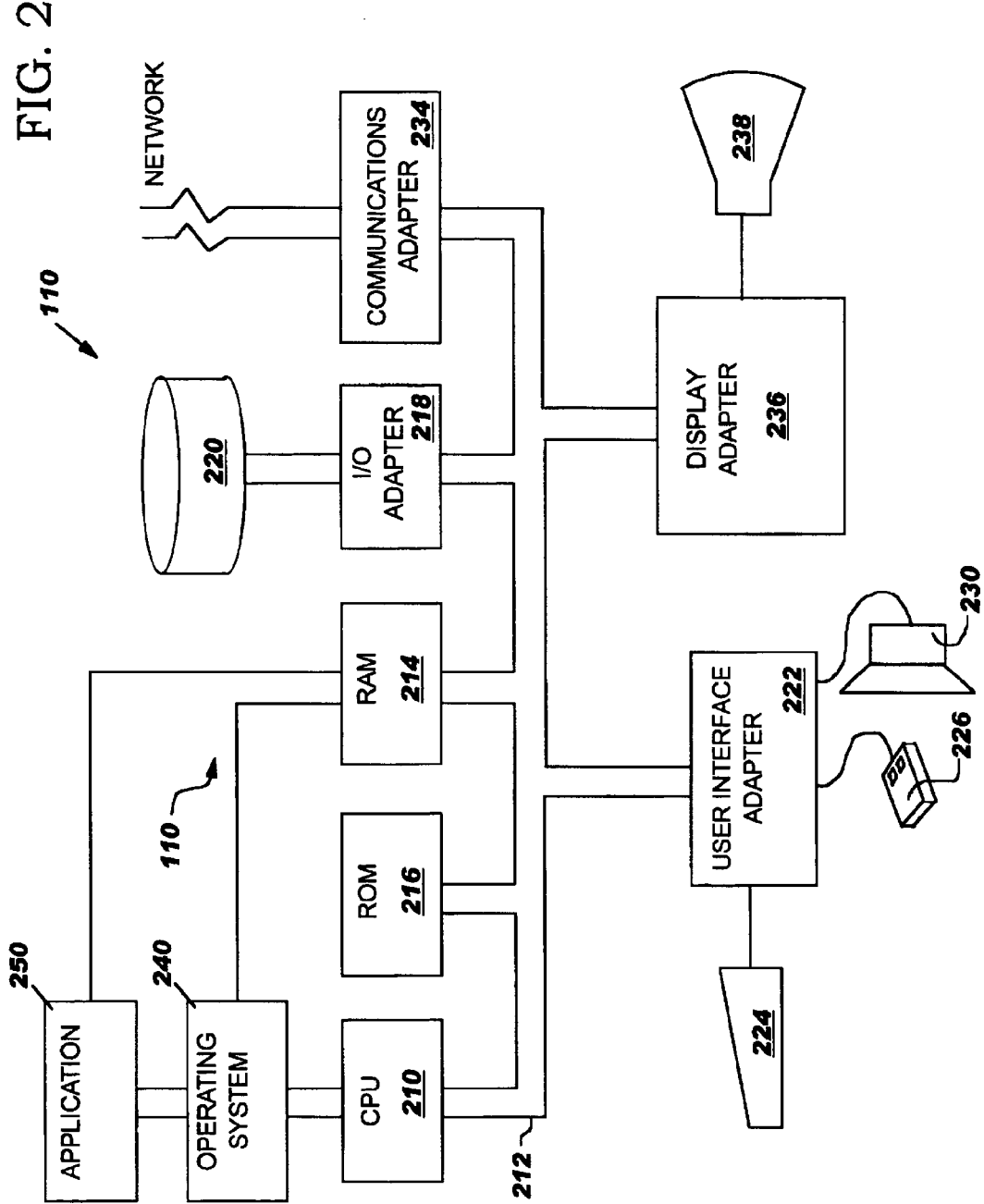
FIG. 2 illustrates an embodiment of the present invention of a client in the network system.

FIG. 2 illustrates a typical hardware configuration of client 110 which is representative of a hardware environment for practicing the present invention. Client 110 may have a central processing unit (CPU) 210 coupled to various other components by system bus 212. An operating system 240, may run on CPU 210 and provide control and coordinate the functions of the various components of FIG. 2. An application 250 in accordance with the principles of the present invention may run in conjunction with operating system 240 and provide calls to operating system 240 where the calls implement the various functions or services to be performed by application 250. Read only memory (ROM) 216 may be coupled to system bus 212 and include a basic input/output system ("BIOS") that controls certain basic functions of client 110. Random access memory (RAM) 214, I/O adapter 218 and communications adapter 234 may also be coupled to system bus 212. It should be noted that software components including operating system 240 and application 250 may be loaded into RAM 214 which may be the computer system's main memory. I/O adapter 218 may be a small computer system interface ("SCSI") adapter that communicates with a disk unit 220, e.g., disk drive.

Communications adapter 234 may interconnect bus 212 with an outside network enabling client 110 to communicate with server 120 via a Local Area Network (LAN), e.g., Ethernet, Token Ring, ARCnet or a Wide Area Network (WAN), e.g., Internet. Input/Output devices may also be connected to system bus 212 via a user interface adapter 222 and a display adapter 236. Keyboard 224, mouse 226 and speaker 230 may all be interconnected to bus 212 through user interface adapter 222. Event data may be inputted to client 110 through any of these devices. A display monitor 238 may be connected to system bus 212 by display adapter 236. In this manner, a user is capable of inputting to client 110 through keyboard 224 or mouse 226 and receiving output from client 110 via display 238 or speaker 230.

FIG. 3—Server

Figure 3:
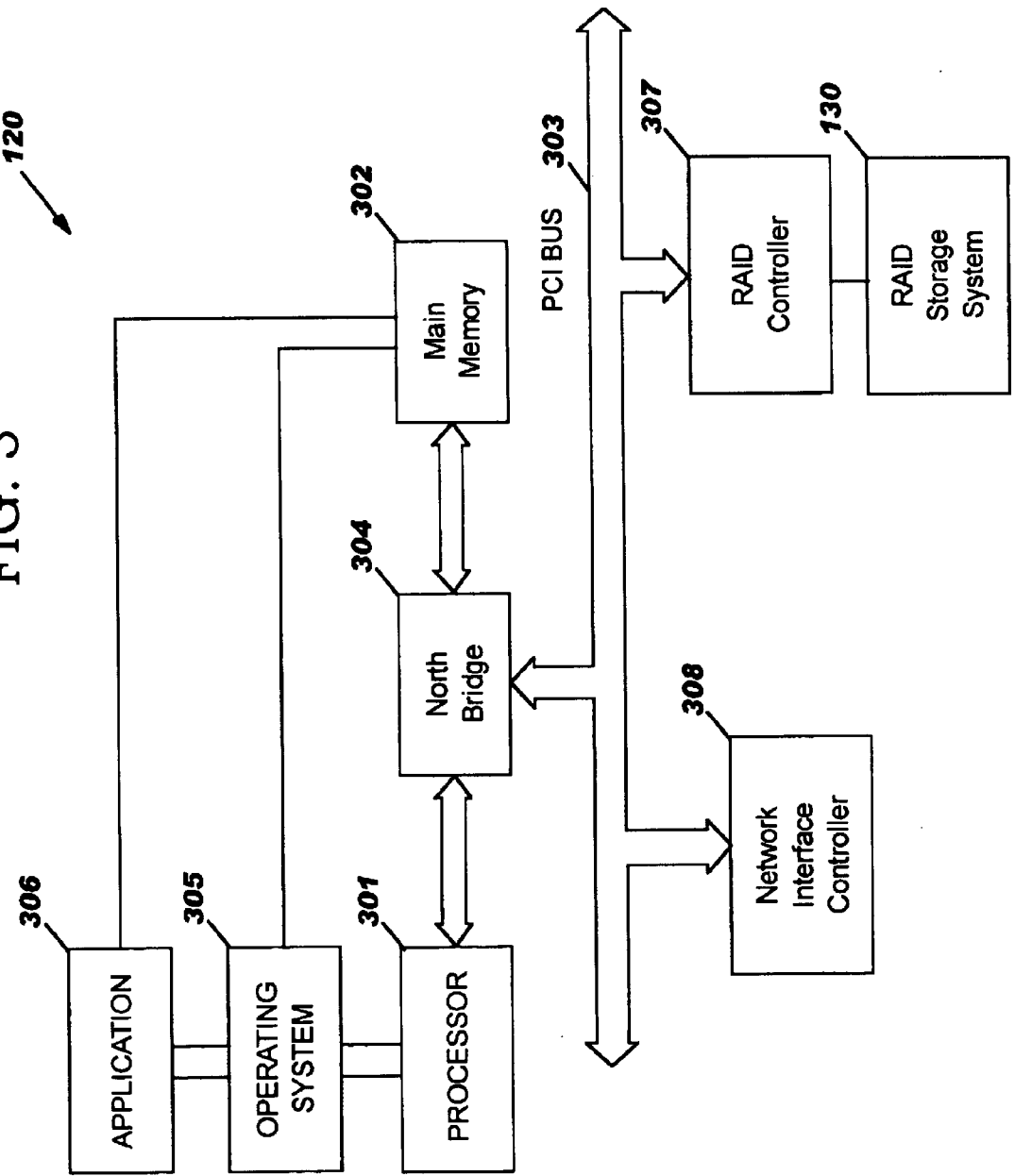
FIG. 3 illustrates an embodiment of the present invention of a server in the network system.

FIG. 3 illustrates a typical hardware configuration of server 120 which is representative of a hardware environment for practicing the present invention. Server 120 may employ a peripheral component interconnect (PCI) local bus architecture. Although the depicted example employs a PCI bus, other bus architectures such as Accelerated Graphics Port (AGP) and Industry Standard Architecture (ISA) may be used. Processor 301 and main memory 302, e.g., Dynamic Random Access Memory (DRAM), Synchronous DRAM (SDRAM), may be connected to PCI local bus 303 through north bridge 304. North bridge 304 may also include an integrated memory controller and cache memory for processor 301. Furthermore, an operating system 305 may run on processor 301 to provide control and coordinate the functions of the various components of FIG. 3. An application 306 in accordance with the principles of the present invention may run in conjunction with operating system 305 and provide calls to operating system 305 where the calls implement the various functions or services to be performed by operating system 305 for application 306. It should be noted that software components including operating system 305 and application 306 may be loaded into system's main memory 302.

RAID controller 307 and network interface connection 308 may also be connected to PCI local bus 303. RAID controller 307 may be coupled to RAID storage system 130 thereby providing an interface between server 120 and RAID storage system 130. RAID controller 307 may be configured to receive requests, e.g., read/write requests, to read from or write to a particular disk in RAID storage system 130. A more detailed description of RAID controller 307 is provided below in FIG. 4. Network Interface controller 308 may interconnect PCI bus 303 with an outside network enabling server 120 to communicate with clients 110 or RAID storage system 130 via a Local Area Network (LAN), e.g., Ethernet, Token Ring, ARCnet or a Wide Area Network (WAN), e.g., Internet.

Those of ordinary skill in the art will appreciate that the hardware in FIG. 3 may vary depending on the implementation. Other internal hardware or peripheral devices, such as flash ROM (or equivalent non-volatile memory) or optical disk drives and the like, may be used in addition to or in place of the hardware depicted in FIG. 3. It is noted that the depicted example in FIG. 3 and the above described example are not meant to imply architectural limitations.

Implementations of the invention include implementations as a computer system programmed to execute the method or methods described herein, and as a computer program product. According to the computer system implementations, sets of instructions for executing the method or methods may be resident in main memory 302 of one or more computer systems configured generally as described above. Until required by server 120, the set of instructions may be stored as a computer program product in another computer memory. Furthermore, the computer program product may be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 4:
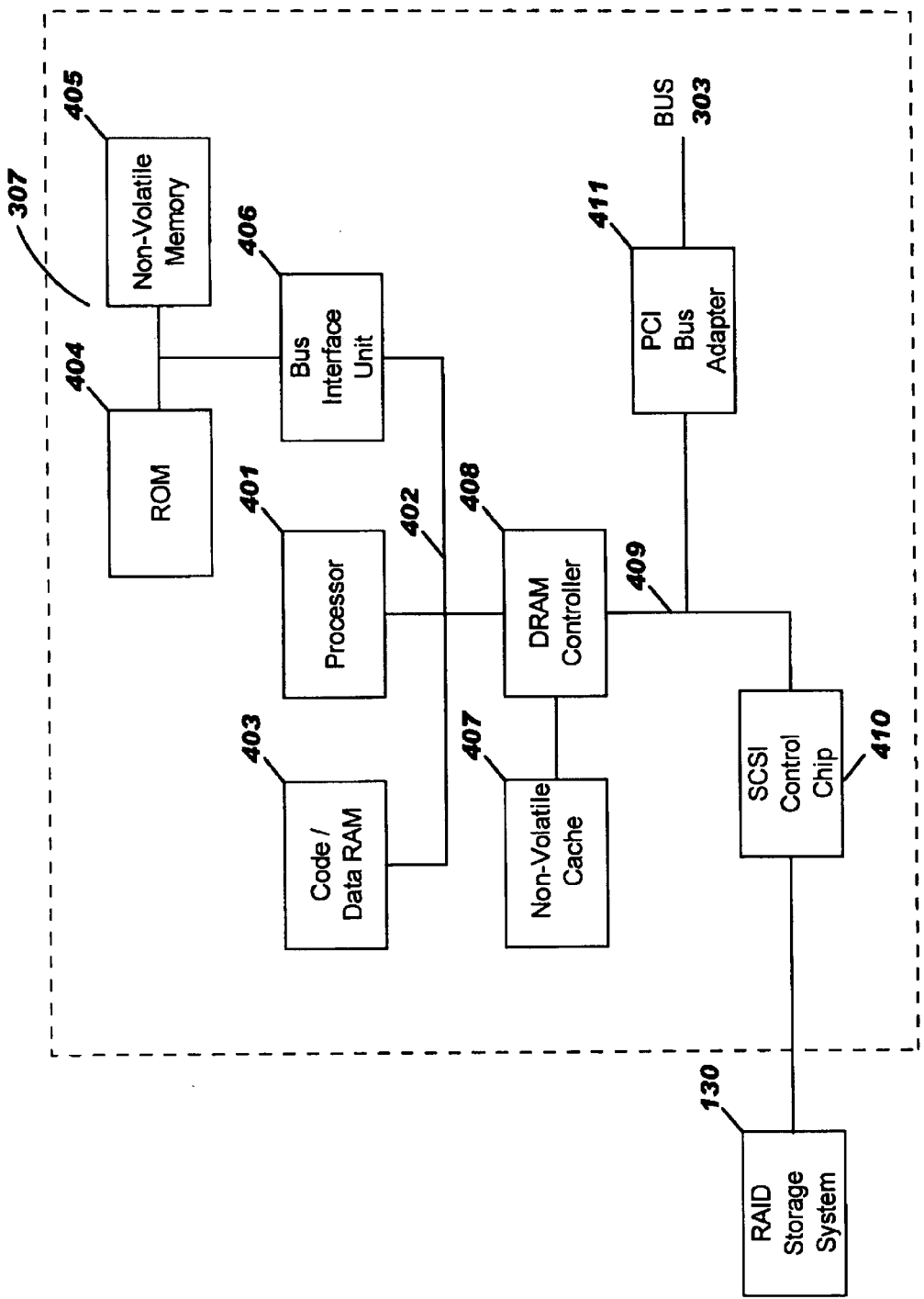
FIG. 4 illustrates a RAID controller configured in accordance with the present invention.

FIG. 4—RAID Controller

FIG. 4 illustrates an embodiment of RAID controller 307 configured in accordance with the present invention. As depicted, RAID controller 307 may comprise a processor 401 configured to control RAID storage system 130. Processor 401 may preferably be an advanced microprocessor which may be coupled to processor bus 402. As depicted, also coupled to processor bus 402 is code/data RAM 403 which may be utilized to temporarily store code and data utilized by processor 401. ROM 404 and non-volatile memory 405 may be accessed utilizing an 8-bit bus and thus bus interface 406 may be utilized to interface those devices to processor bus 402, which typically utilizes a 32-bit bus.

Operational code may be stored within ROM 404, which, as those skilled in the art will appreciate, is generally provided utilizing so-called "flash" ROM. Operational code may thereafter be fetched from ROM 404 by processor 401 upon initiation of operation to direct the operation of processor 401 to perform functions including the functions of the present invention. Non-volatile memory 405 may be a low power CMOS memory which is powered up for "backup" by a battery such that the information stored in non-volatile memory 405 will not be lost when main power is terminated. Thus, non-volatile memory 405 may be utilized to store configuration data or operational code in a manner similar to that stored within ROM 404. ROM 404 may generally be updated at initial power application and any changes to system configuration during operation may be stored within non-volatile memory 405 and then entered into a "device change list" which may also be stored within non-volatile memory 405 and on each disk drive within the system. Furthermore, non-volatile memory 405 may store the program for updating firmware in a disk in RAID storage system 130 implementing either a RAID level one or a RAID level five without deactivating server 120 as described in conjunction with the description of FIGS. 5–8.

It is noted that the program of the present invention that updates firmware in a disk in RAID storage system 130 implementing either a RAID level one or a RAID level five without deactivating server 120 as described in conjunction with the description of FIGS. 5–8 may reside in other memory units, e.g., ROM 404, or a driver associated with operating system 305 of server 120. Furthermore, non-volatile memory 405 may be configured to store a table used for tracking any stripes that have been updated in the physical disk of RAID storage system 130 whose firmware is being updated as described in greater detail in conjunction with FIGS. 5–8.

A non-volatile cache 407 may be coupled to DRAM/XOR controller 408. Non-volatile cache 407 may be configured into a plurality of temporary storage positions for data. That is, non-volatile cache 407 may be configured to store a copy of the updated data to be stored in the physical disk of RAID storage system 130 whose firmware is being updated as described in greater detail in conjunction with FIGS. 7–8. DRAM/XOR controller 408 may be utilized to control access to random access memory and also provides a hardware implemented exclusive or (XOR) circuit which may be utilized to rapidly and efficiently calculate parity for changes in updated data as well as utilized to perform the calculations discussed in FIG. 8.

DRAM/XOR controller 408 may be coupled to local bus 409. Also coupled to local bus 409 may be one or more small computer system interface (SCSI) control chips 410. Each SCSI control chip 410 may be defined as including channels which may each support RAID storage system 130.

RAID controller 307 may further comprise a PCI bus adapter 411 configured to interconnect RAID controller 307 with PCI bus 303 (FIG. 3).

Those having ordinary skill in this art will appreciate that FIG. 4 is illustrative and that FIG. 4 is not meant to imply architectural limitations.

Figure 5:
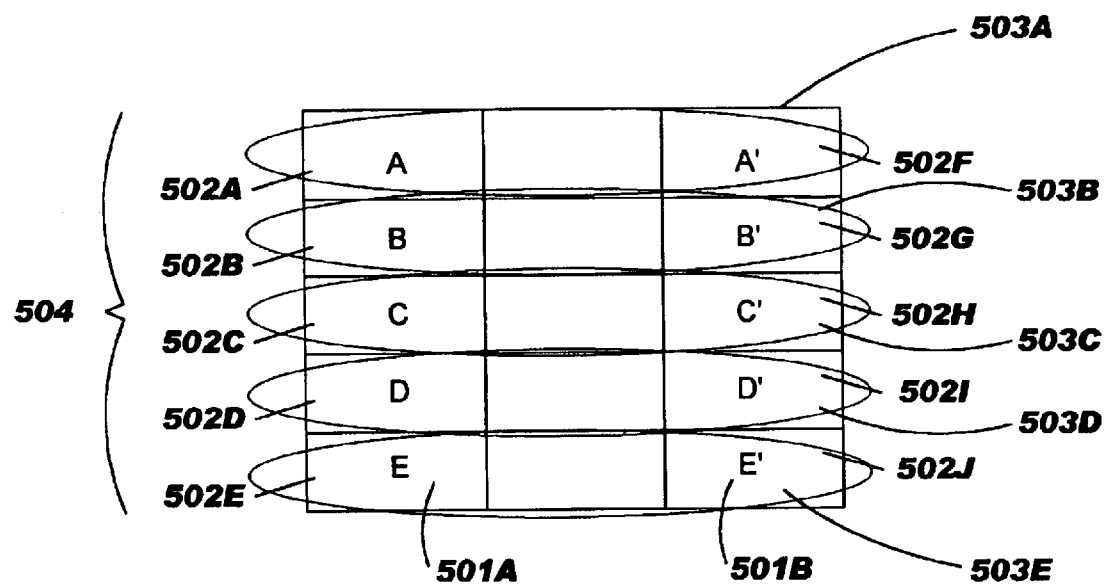
FIG. 5 illustrates an exemplary disk array of a RAID storage system implementing RAID level one.

FIG. 5—RAID Level One

FIG. 5 illustrates RAID storage system 130 implementing RAID level one which uses mirroring in order to store identical data on two disks. Referring to FIG. 5, the disk array in RAID storage system 130 implementing RAID level one may comprise physical disks 501A–B. Physical disks 501A–B may collectively or individually be referred to as physical disk 501. Each physical disk 501 may comprise a plurality of units commonly referred to as stripe units 502A–J. For example, physical disk 501A may comprise stripe units 502A–E. Physical disk 501B may comprise stripe units 502F–J. Stripe units 502A–J may collectively or individually be referred to as stripe units 502 or stripe unit 502, respectively. Each stripe unit 502 may be configured to store a predefined amount, e.g., bit(s), byte(s), of data. It is noted that each physical disk 501 may comprise any number of stripe units 502. It is further noted that RAID level one may comprise any number of physical disks 501 and that FIG. 5 is illustrative.

A stripe 503A–E may refer to a group of corresponding stripe units 502. For example, stripe 503A may include stripe units A and A'. Stripe 503B may include stripe units B and B' and so forth. Stripes 503A–E may collectively or individually be referred to as stripes 503 or stripe 503.

The disk array in RAID storage system 130 implementing RAID level one may include logical drives which divide physical drives 501 in the disk array into logical components which may be viewed by client 110 as separate drives. Each logical drive may include a cross section of each of physical drives 501. For example, logical drive 504 may include stripes 503A–E across physical drives 501A–B.

Figure 6:
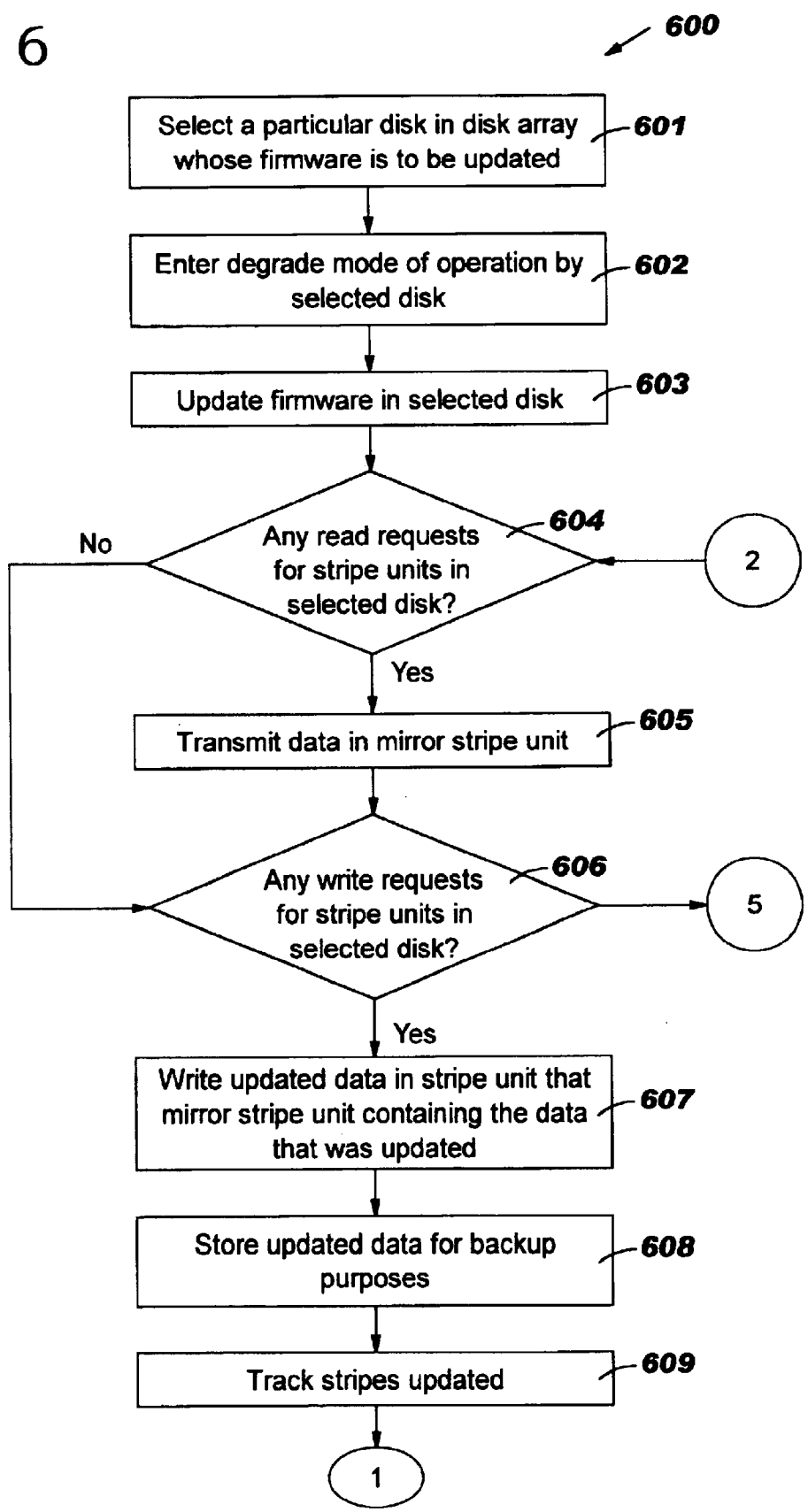
FIG. 6 is a flowchart of a method for updating firmware on a disk in the RAID storage system implementing RAID level one.
Figure 6:
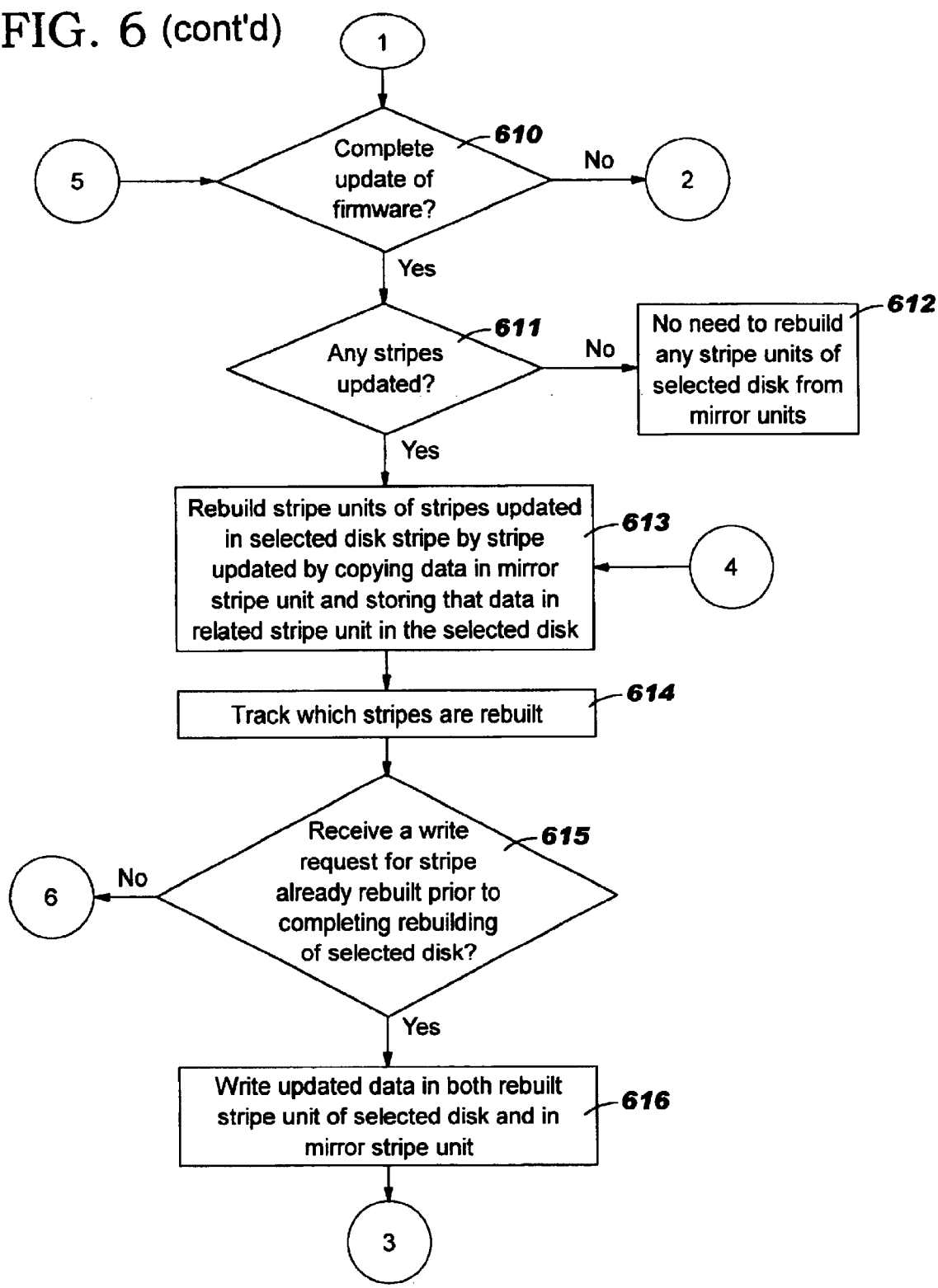
Figure 6:
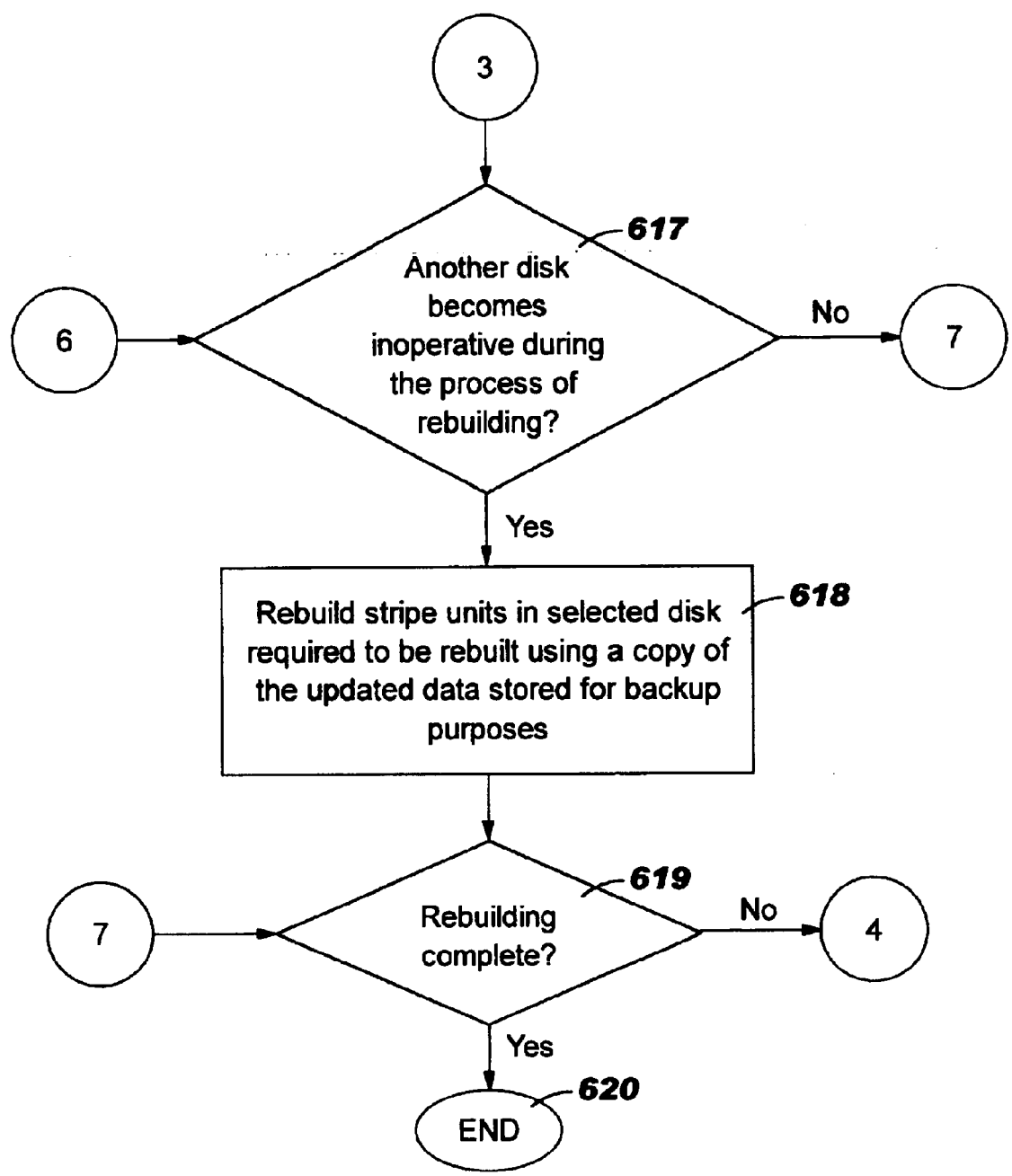

FIG. 6—Method for Updating Firmware on a Disk In a RAID Level One System

FIG. 6 is a flowchart of one embodiment of the present invention of a method 600 for updating firmware on a disk in RAID storage system 130 implementing a RAID level one system without deactivating server 120. As stated in the Background Information section, each disk in the disk array of a RAID may store firmware where firmware may refer to software that may be burned into a memory chip, e.g., Read Only Memory (ROM), Programmable ROM (PROM), Erasable PROM (EPROM), Electrical EPROM (EEPROM), or into the hard drive. In order to update the firmware stored on a disk in the disk array of a RAID, all activity on that disk must become inactive. If the disk receives a request to read from or write to that disk during the process of upgrading the firmware, the disk may become inoperative either permanently or temporarily. Subsequently, the server coupled to the RAID comprising the disk with the firmware to be updated must be deactivated thereby assuring that the disk does not receive any I/O requests. However, some servers such as mission critical servers may be required to stay active continuously. It would therefore be desirable to be able to update firmware on the disks in a RAID storage system without deactivating the server coupled to the RAID thereby allowing the server to continuously stay active. Method 600 is a method for updating firmware on a disk in RAID storage system 130 implementing a RAID level one system without deactivating server 120.

Referring to FIGS. 5 and 6, in step 601, a particular physical disk 501, e.g., physical disk 501A, in RAID storage system 130 (FIGS. 1 and 3) implementing a RAID level one system may be selected to update the firmware in that particular disk 501.

In step 602, the selected disk 501, e.g., physical disk 501A, as well as the associated logical drives 504 (FIG. 5) enter a degrade mode of operation. In the degrade mode of operation, RAID controller 307 (FIGS. 3 and 4) may suppress particular activities, e.g., recovery actions, hot spare kickin, from occurring on selected disk 501 as well as prevent requests, e.g., read/write requests issued from client 110 (FIG. 1), hot swap queries, from reaching selected disk 501. By suppressing particular activities from occurring on the selected disk 501 and preventing requests from reaching selected disk 501, activity on the selected disk 501 may become inactive thereby allowing the firmware on the selected disk 501 to be updated.

In step 603, the firmware on the selected disk 501, e.g., physical disk 501A, may be updated.

During the updating of the firmware on the selected disk 501, e.g., physical disk 501A, the following steps 604–610 may occur. In step 604, a determination may be made as to whether RAID controller 307 received any read requests for stripe units 502 in the selected disk 501, e.g., physical disk 501A. If RAID controller 307 received a request to read data stored in a stripe unit 502, e.g., stripe unit 502A, in the selected disk 501, e.g., physical disk 501A, then, in step 605, RAID controller 307 may retrieve and transmit the requested data stored in stripe unit 502, e.g., stripe unit 502F, that mirrors stripe unit 502, e.g., stripe unit 502A, containing the requested data. For example, if client 110, e.g., client 110A, requested to read the data labeled "A" in stripe unit 502A during updating of the firmware on physical disk 501A, then RAID controller 307 may retrieve and transmit the data labeled "A'" in stripe unit 502F that mirrors stripe unit 502A.

If RAID controller 307 did not receive a request to read data stored in stripe unit 502, e.g., stripe unit 502A, in the selected disk 501, e.g., physical disk 501A, then, in step 606, a determination may be made as to whether RAID controller 307 received any write requests for stripe units 502 in selected disk 501, e.g., physical disk 501A. Furthermore, upon transmitting the requested data stored in stripe unit 502, e.g., stripe unit 502F, that mirrors stripe unit 502, e.g., stripe unit 502A, containing the requested data in step 605, a determination may be made in step 606 as to whether RAID controller 307 received any write requests for stripe units 502 in the selected disk 501, e.g., physical disk 501A.

If RAID controller 307 did not receive any write requests for stripe units 502 in selected disk 501, e.g., physical disk 501A, then a determination may be made in step 610 as to whether the updating of the firmware is complete as discussed further below.

If RAID controller 307 received any write requests for stripe units 502 in the selected disk 501, e.g., physical disk 501A, then, in step 607, RAID controller 307 may write the updated data in stripe unit 502, e.g., stripe unit 502F, that mirrors stripe unit 502, e.g., stripe unit 502A, containing the data that was updated. For example, if client 110, e.g., client 110A, requested to write over the data labeled "A" in stripe unit 502A during updating of the firmware on physical disk 501A, then RAID controller 307 may write over the data labeled "A'" in stripe unit 502F that mirrors stripe unit 502A to store the updated data. If client 110, e.g., client 110A, requested to write over the data labeled "D" in stripe unit 502A during updating of the firmware on physical disk 501A, then RAID controller 307 may write over the data labeled "D'" in stripe unit 502D that mirrors stripe unit 502A to store the updated data.

In step 608, a copy of the updated data may be stored for backup purposes. In one embodiment, a copy of the updated data may be stored in a non-volatile cache 407 (FIG. 4) in RAID controller 307.

In step 609, stripe 503, e.g., stripe 503A, stripe 503D, associated with stripe units 502, e.g., stripe unit 502A, stripe unit 502D, in the selected disk 501, e.g., physical disk 501A, whose data was changed may be tracked. In one embodiment, stripes 503 associated with stripe units 502 in the selected disk 501 whose data was changed may be tracked in a table stored in non-volatile memory 405 (FIG. 4) of RAID controller 307.

In step 610, a determination may be made if the updating of the firmware on the selected disk 501, e.g., physical disk 501A, is completed. Upon completion of the firmware being updated on the selected disk 501, e.g., physical disk 501A, the stripe units 502 in the selected disk 501, e.g., physical disk 501A, associated with any stripes to be updated, may be rebuilt as described further below in steps 613–619.

If the updating of the firmware is not completed, then a determination may be made as to whether RAID controller 307 received any read requests for stripe units 502 in the selected disk 501, e.g., physical disk 501A, in step 604.

If the updating of the firmware is complete, then, in step 611, a determination may be made as to whether any stripes 503 were updated. If there were no stripes 503 updated, then, in step 612, there is no need to rebuild any stripe units 502, e.g., stripe units 502A–E, in the selected disk 501, e.g., disk 501A.

If there were stripes 503 updated, then a stripe unit 502, e.g., stripe unit 502A, associated with a stripe 503 updated may be rebuilt in step 613. In one embodiment, stripe units 502, e.g., stripe unit 502A, in the selected disk 501, e.g., disk 501A, associated with stripes 503 that have been updated may be rebuilt stripe by stripe 503 updated, e.g., stripe 503A, stripe 503D, starting from the top stripe 503 that was updated, e.g., stripe 503A, to the bottom stripe 503, e.g., stripe 503D, if any, that was updated. In one embodiment, the stripe unit 502, e.g., stripe unit 502A, associated with a stripe 503 updated may be rebuilt by copying data in the stripe unit 502, e.g., stripe unit 502F, that mirrors the stripe unit 502, e.g., stripe unit 502A, to be rebuilt and storing that data in the stripe unit 502, e.g., stripe unit 502A, to be rebuilt.

In step 614, each stripe 503, e.g., stripe 503A, associated with the stripe unit 502, e.g., stripe unit 502A, rebuilt may be tracked. In one embodiment, stripes 503 associated with stripe units 502 rebuilt may be tracked in a table stored in non-volatile memory 405 in RAID controller 307.

In step 615, a determination may be made as to whether RAID controller 307 received a write request for a stripe unit 502, e.g., stripe unit 502A, rebuilt in the selected disk 501, e.g., disk 501A, prior to completing the rebuilding of all stripe units 502 required to be rebuilt.

If RAID controller 307 did not receive a write request for a stripe unit 502, e.g., stripe unit 502A, rebuilt in the selected disk 501, e.g., disk 501A, prior to completing the rebuilding of all stripe units 502, e.g., stripe unit 502D, required to be rebuilt, then, in step 617, a determination may be made as to whether another disk 501 in the disk array of RAID storage system 130 has become inoperative during the process of rebuilding the stripe units 502 in the selected disk 501 required to be rebuilt as discussed further below.

If RAID controller 307 received a write request for a stripe unit 502, e.g., stripe unit 502A, rebuilt in the selected disk 501, e.g., disk 501A, prior to completing the rebuilding of all stripe units 502, e.g., stripe unit 502D, required to be rebuilt, then, in step 616, the updated data may be written in both the stripe unit 502, e.g., stripe unit 502A, rebuilt in the selected disk 501, e.g., disk 501A, and in the stripe unit 502, e.g., stripe unit 502F, that mirrors the stripe unit 502, e.g., stripe unit 502A, rebuilt. For example, if stripes 503A and 503D were indicated as being rebuilt, then stripe units 502A and 502D need to be updated with the updated data. If after stripe unit 502A is updated and prior to stripe unit 502D being updated, a request to write data to stripe unit 502A is received, then RAID controller 307 may write the updated data in stripe unit 502, e.g., stripe unit 502A, already rebuilt in selected disk 501, e.g., disk 501A, as well as in the stripe unit 502, e.g., stripe unit 502F, that mirrors the stripe unit 502, e.g., stripe unit 502A, rebuilt whose data was overwritten with the updated data.

In step 617, a determination may be made as to whether another disk 501 in the disk array of RAID storage system 130 has become inoperative during the process of rebuilding the stripe units 502 in selected disk 501 required to be rebuilt.

If another disk 501, e.g., disk 501B, in the disk array of RAID storage system 130 does not become inoperative during the process of rebuilding the stripe units 502 in the selected disk 501 required to be rebuilt, then a determination may be made in step 619 as to whether the rebuilding of the stripe units 502, e.g., stripe units 502A, stripe units 502D, whose data has changed has been completed as discussed further below.

If another disk 501, e.g., disk 501B, in the disk array of RAID storage system 130 has become inoperative during the process of rebuilding the stripe units 502 in the selected disk 501 required to be rebuilt, then once that disk 501, e.g., disk 501B, becomes operative, the stripe units 502, e.g., stripe units 502A, stripe units 502D, in the selected disk 501, e.g., disk 501A, required to be rebuilt may be rebuilt, in step 618, using a copy of the updated data stored for backup purposes in step 608.

In step 619, a determination may be made as to whether the rebuilding of the stripe units 502, e.g., stripe units 502A, stripe units 502D, whose data has changed has been completed. If not, then the next stripe unit 502, e.g., stripe unit 502D, required to be rebuilt may be rebuilt in step 613. If the rebuilding of the stripe units 502, e.g., stripe units 502A, stripe units 502D, in the selected disk 501, e.g., physical disk 501A, whose data has changed has been completed, then method 600 may be terminated in step 620.

It is noted that even though method 600 describes a method for updating firmware on a disk in RAID storage system 130 implementing a RAID level one system without deactivating RAID controller 307 that the principles described in method 600 may be applicable to any redundant RAID level. It is further noted that a person of ordinary skill would be capable of applying the principles taught in method 600 to any redundant RAID level. It is further noted that method 600 may be executed in a different order presented and that the order presented in the discussion of FIG. 6 is illustrative. It is further noted that certain steps in method 600 may be executed almost concurrently.

Figure 7:
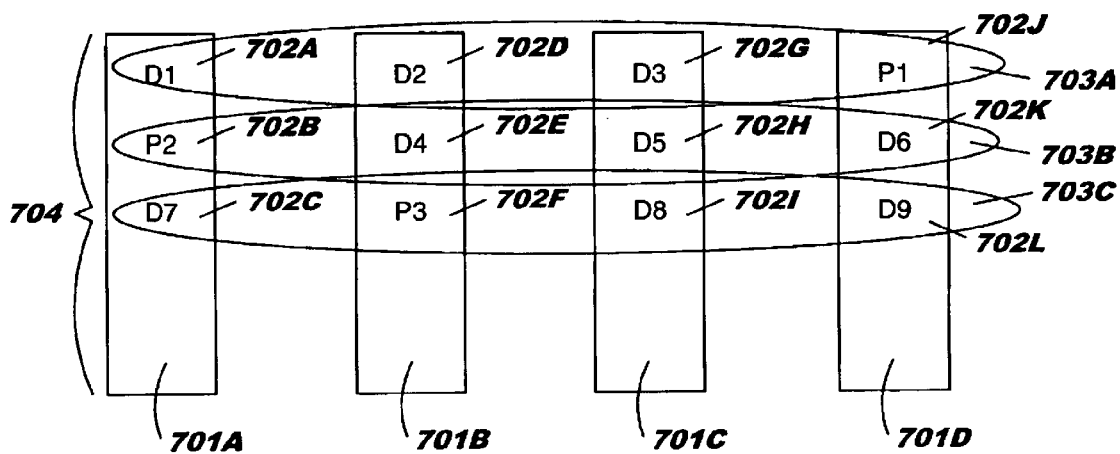
FIG. 7 illustrates an exemplary disk array of a RAID storage system implementing RAID level five.

FIG. 7—RAID Level Five

FIG. 7 illustrates RAID storage system 130 implementing RAID level five where RAID level five uses data interleaving by striping data across all disks and provides for error correction by distributing parity data across all disks. Referring to FIG. 7, the disk array in RAID storage system 130 implementing RAID level five may comprise a plurality of physical disks 701A–D configured to store data including parity data. Physical disks 701A–D may collectively or individually be referred to as physical disks 701 or physical disk 701. It is noted that the disk array of RAID storage system 130 implementing RAID level five may comprise any number of physical disks 701 and that FIG. 7 is illustrative.

Each physical disk 701 may comprise a plurality of units commonly referred to as stripe units 702A–L. For example, physical disk 701A may comprise stripe units 702A–C. Physical disk 701B may comprise stripe units 702D–F and so forth. Stripe units 702A–L may collectively or individually be referred to as stripe units 702 or stripe unit 702, respectively. Each stripe unit 702 may be configured to store a predefined amount, e.g., bit(s), byte(s), of data including parity data. Stripe units 702 that are labeled with a "D" refers to stripe units 702 that store non-parity data. Stripe units 702 that are labeled with a "P" refers to stripe units 702 that store parity data. It is noted that each physical disk 701 may comprise any number of stripe units 702.

A stripe 703A–C may refer to a group of corresponding stripe units 702. For example, stripe 703A may include stripe units D1, D2, D3 and P1. Stripe 703B may include stripe units P2, D4, D5 and D6. Stripe 703C may include stripe units D7, P3, D8 and D9. Stripes 703A–C may collectively or individually be referred to as stripes 703 or stripe 703.

The disk array in RAID storage system 130 may include logical drives which divide physical drives 701 in the disk array into logical components which may be viewed by client 110 as separate drives. Each logical drive may include a cross section of each of physical drives 701. For example, logical drive 704 may include stripes 703A–C across physical drives 701A–D.

Figure 8:
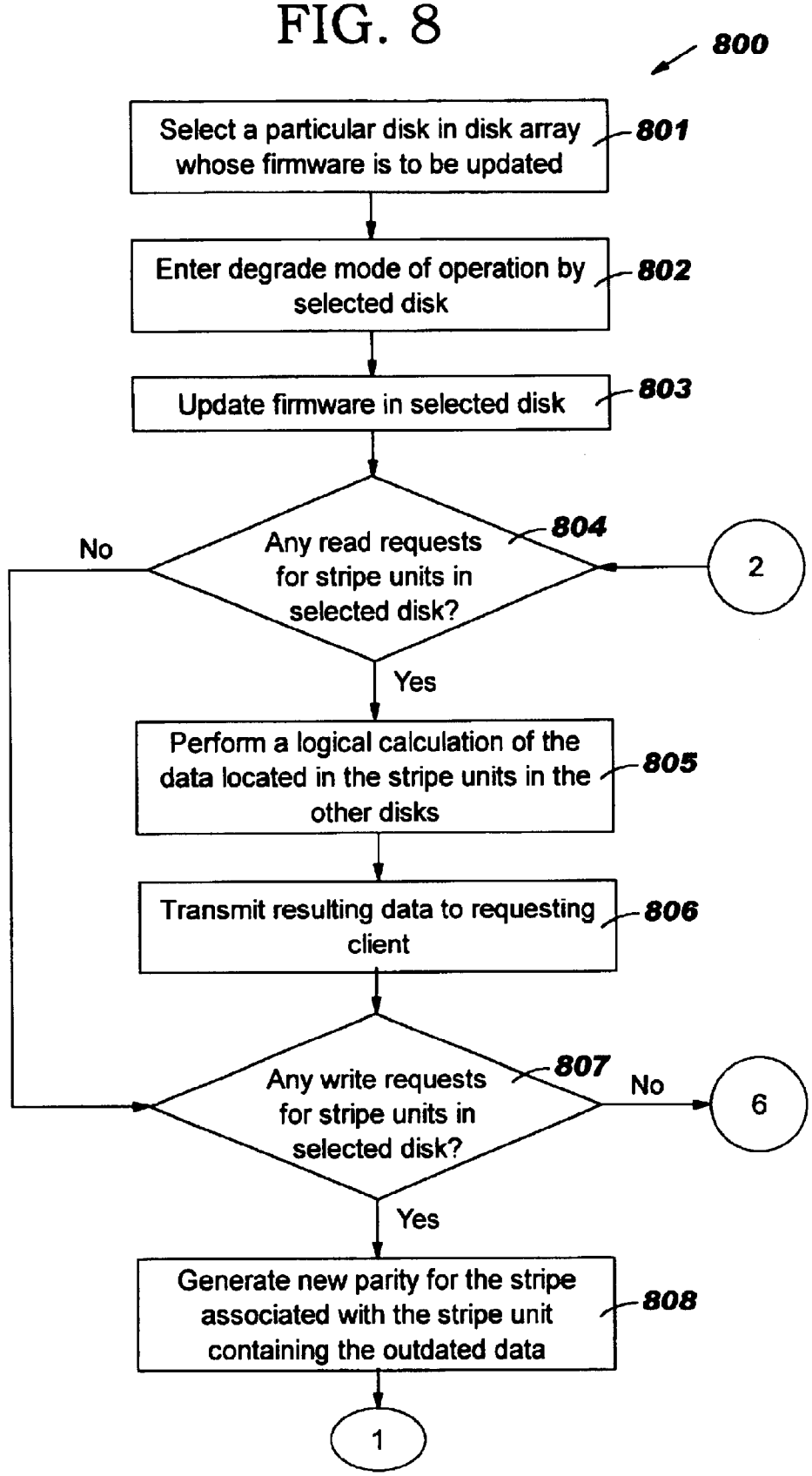
FIG. 8 is a flowchart of a method for updating firmware on a disk in the RAID storage system implementing RAID level five.
Figure 8:
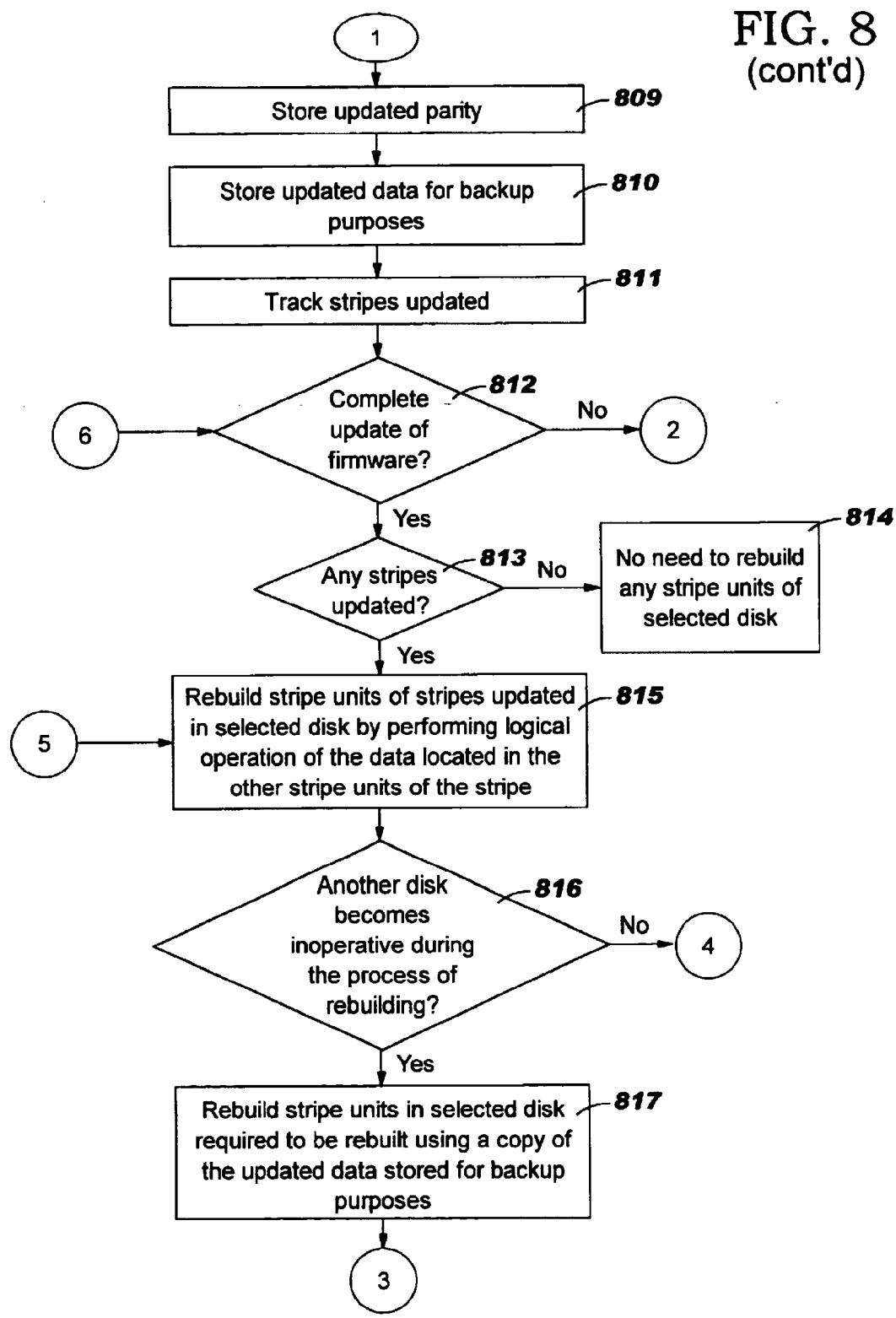
Figure 8:
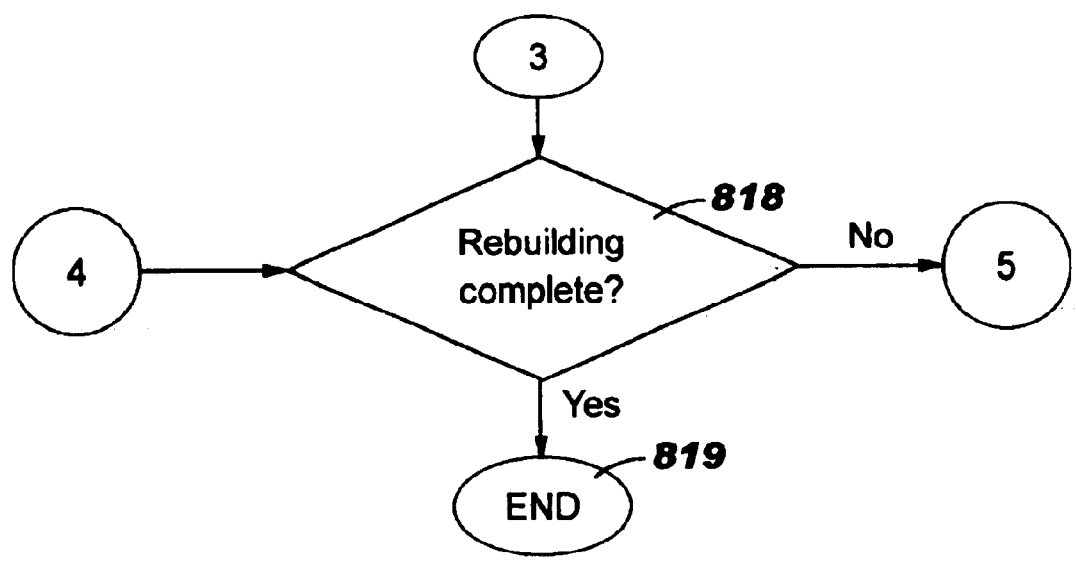

FIG. 8—Method for Updating Firmware on a Disk In a RAID Level Five System

FIG. 8 is a flowchart of one embodiment of the present invention of a method 800 for updating firmware on a disk in RAID storage system 130 implementing a RAID level five system without deactivating server 120.

Referring to FIGS. 7 and 8, in step 801, a particular physical disk 701, e.g., physical disk 701A, in RAID storage system 130 (FIGS. 1 and 3) implementing a RAID level five system may be selected to update the firmware in that particular disk 501.

In step 802, the selected disk 701, e.g., physical disk 701A, as well as the associated logical drives 704 (FIG. 7) may enter a degrade mode of operation. In the degrade mode of operation, RAID controller 307 (FIGS. 3 and 4) may suppress particular activities, e.g., recovery actions, hot spare kickin, from occurring on the selected disk 701 as well as prevent requests, e.g., read/write requests issued from client 110 (FIG. 1), hot swap queries, from reaching the selected disk 701. By suppressing particular activities from occurring on the selected disk 701 and preventing requests from reaching selected disk 701, activity on the selected disk 701 may become inactive thereby allowing the firmware on the selected disk 701 to be updated.

In step 803, the firmware on the selected disk 701, e.g., physical disk 701A, may be updated.

During the updating of the firmware on the selected disk 701, e.g., physical disk 701A, the following steps 804–812 may occur. In step 804, a determination may be made as to whether RAID controller 307 received any read requests for stripe units 702 in the selected disk 701, e.g., physical disk 701A. If RAID controller 307 received a request to read data stored in a stripe unit 702, e.g., stripe unit 702A, in the selected disk 701, e.g., physical disk 701A, then, in step 805, RAID controller 307 may perform a logical calculation on data, e.g., D2, D3 and P1, located in other stripe units 702, e.g., stripe units 702D, 702G and 702J, of stripe 703, e.g., stripe 703A, associated with the stripe unit 702, e.g., stripe unit 702A, containing the data requested. In one embodiment, the logical calculation may be an exclusive or (XOR) calculation performed by DRAM/XOR controller 408 (FIG. 4). For example, the data requested in stripe unit 702, e.g., stripe unit 702A, in the selected disk 701, e.g., physical disk 701A, may be calculated by performing the XOR function on D2, D3 and P1. The resulting data may then be transmitted to the requesting client 110 in step 806.

If RAID controller 307 did not receive a request to read data stored in stripe unit 702, e.g., stripe unit 702A, in the selected disk 701, e.g., physical disk 701A, then, in step 807, a determination may be made as to whether RAID controller 307 received any write requests for stripe units 702 in the selected disk 701, e.g., physical disk 701A. Furthermore, upon transmitting the requested data in step 806, a determination may be made in step 807 as to whether RAID controller 307 received any write requests for stripe units 702 in the selected disk 701, e.g., physical disk 701A.

If RAID controller 307 did not receive any write requests for stripe units 702 in the selected disk 701, e.g., physical disk 701A, then a determination may be made in step 812 as to whether the updating of the firmware is complete as discussed further below.

If RAID controller 307 received any write requests for stripe units 702 in the selected disk 701, e.g., physical disk 701A, then, in step 808, RAID controller 307 may generate a new parity for the stripe 703, e.g., stripe 703A, associated with stripe unit 702, e.g., stripe unit 702A, containing outdated data. A new parity for the stripe 703, e.g., stripe 703A, associated with the stripe unit 702, e.g., stripe unit 702A, containing outdated data may be generated so that the updated data may replace the outdated data as explained further below. For example, if client 110 requests to write data D1 in stripe unit 702A during the updating of the firmware on disk 501A, then a new parity P1 may be generated for stripe 703A associated with stripe unit 702A. In one embodiment, a new parity may be generated by performing a logical operation on the data to be written along with the data stored in other stripe units 702, e.g., stripe unit 702B, stripe unit 702C, except the stripe unit 702, e.g., stripe unit 702J, storing the parity data to be updated and the stripe unit 702, e.g., stripe unit 702A, of the selected disk 701, e.g., disk 701A, whose firmware is being updated. In one embodiment, the logical calculation may be an exclusive or (XOR) calculation performed by DRAM/XOR controller 408. For example, if the data to be written over D1 was X, then a new parity may be generated for P1 by performing the XOR function on X, D2 and D3. The updated parity may then replace the older parity associated the stripe 703, e.g., 703A, updated in step 809.

In step 810, a copy of the updated data, i.e., the data requested to be written in stripe units 702 in the selected disk 701, may be stored for backup purposes. In one embodiment, a copy of the updated data may be stored in either a non-volatile cache 407 (FIG. 4) in RAID controller 307 or in a special storage area typically called a log area in a limited number, e.g., two, of other drives 701, e.g., disk 701B, disk 701C. It is noted for clarity that each drive 701 may be capable of containing a special storage area typically called a log area.

In step 811, stripe 703, e.g., stripe 703A, associated with stripe unit 702, e.g., stripe unit 702A, in the selected disk 701, e.g., physical disk 701A, whose data was changed may be tracked. In one embodiment, stripes 703 associated with stripe units 702 in selected disk 701 whose data was changed may be tracked in a table stored in non-volatile memory 405 (FIG. 4) of RAID controller 307.

In step 812, a determination may be made if the updating of the firmware on the selected disk 701, e.g., physical disk 701A, is completed. Upon completion of the firmware being updated on the selected disk 701, e.g., physical disk 701A, the stripe units 702 in the selected disk 701, e.g., physical disk 701A, associated with any stripes to be updated, may be rebuilt as described further below in steps 813–818.

If the updating of the firmware is not completed, then a determination may be made as to whether RAID controller 307 received any read requests for stripe units 702 in the selected disk 701, e.g., physical disk 701A, in step 804.

If the updating of the firmware is complete, then, in step 813, a determination may be made as to whether any stripes 703 were updated. If there were no stripes 703 updated, then, in step 814, there is no need to rebuild any stripe units 702, e.g., stripe units 702A–C, in the selected disk 701, e.g., disk 701A.

If there were stripes 703 updated, then a stripe unit 702, e.g., stripe unit 702A, associated with a stripe 703 updated may be rebuilt in step 815. In one embodiment, stripe units 702, e.g., stripe unit 702A, in the selected disk 701, e.g., disk 701A, associated with stripes 703 that have been updated may be rebuilt stripe by stripe 703 updated, e.g., stripe 703A, starting from the top stripe 703 that was updated, e.g., stripe 703A, to the bottom stripe 703, if any, that was updated. In one embodiment, the stripe unit 702, e.g., stripe unit 702A, associated with a stripe 703 updated may be rebuilt by performing a logical calculation on data, e.g., D2, D3 and P1, located in other stripe units 702, e.g., stripe units 702D, 702G and 702J, of stripe 703, e.g., stripe 703A, associated with the stripe unit 702, e.g., stripe unit 702A, containing the outdated data. In one embodiment, the logical calculation may be an exclusive or (XOR) calculation performed by DRAM/XOR controller 408. For example, the updated data to be inserted in the stripe unit 702, e.g., stripe unit 702A, in the selected disk 701, e.g., physical disk 701A, to be rebuilt may be calculated by performing the XOR function on D2, D3 and P1. The resulting data may then be inserted in the stripe unit 702, e.g., stripe unit 703A, to be rebuilt.

In step 816, a determination may be made as to whether another disk 501 in the disk array of RAID storage system 130 has become inoperative during the process of rebuilding the stripe units 702 in the selected disk 701 required to be rebuilt.

If another disk 701, e.g., disk 701B, in the disk array of RAID storage system 130 does not become inoperative during the process of rebuilding the stripe units 702 in the selected disk 701 required to be rebuilt, then a determination may be made in step 818 as to whether the rebuilding of the stripe units 702, e.g., stripe units 502A, whose data has changed has been completed as discussed further below.

If another disk 701, e.g., disk 701B, in the disk array of RAID storage system 130 has become inoperative during the process of rebuilding the stripe units 702 in the selected disk 701 required to be rebuilt, then once that disk 701, e.g., disk 701B, becomes operative, the stripe units 702, e.g., stripe units 702A, in the selected disk 701, e.g., disk 701A, required to be rebuilt may be rebuilt, in step 817, using a copy of the updated data stored for backup purposes in step 810.

In step 818, a determination may be made as to whether the rebuilding of the stripe units 702, e.g., stripe units 702A, whose data has changed has been completed. If not, then the next stripe unit 702, e.g., stripe unit 702B, required to be rebuilt may be rebuilt in step 815. If the rebuilding of the stripe units 702, e.g., stripe units 702A, in the selected disk 701, e.g., physical disk 701A, whose data has changed has been completed, then method 800 may be terminated in step 819.

It is noted that even though method 800 describes a method for updating firmware on a disk in RAID storage system 130 implementing a RAID level five system without deactivating server 120 that the principles described in method 800 may be applicable to any redundant RAID level. It is further noted that a person of ordinary skill would be capable of applying the principles taught in method 800 to any redundant RAID level. It is further noted that method 800 may be executed in a different order presented and that the order presented in the discussion of FIG. 8 is illustrative. It is further noted that certain steps in method 800 may be executed almost concurrently.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for updating firmware in a disk in a disk array without deactivating a server coupled to said disk array comprising the steps of:

selecting said disk in said disk array, wherein said selected disk comprises said firmware to be updated, wherein each disk in said disk array comprises a plurality of stripe units;

entering a degrade mode of operation by said selected disk, wherein said degrade mode of operation prevents said selected disk from receiving requests;

updating said firmware in said selected disk; and tracking one or more stripes in said disk array corresponding to one or more of said plurality of stripe units of said selected disk where data in said one or more of said plurality of stripe units of said selected disk change in response to write requests to said selected disk.

2. The method as recited in claim 1 further comprising the steps of:

receiving a request to read from a stripe unit of said selected disk; and transmitting data from a stripe unit that mirrors said stripe unit of said selected disk, wherein said mirror stripe unit is located in another disk of said disk array.

3. The method as recited in claim 1 further comprising the steps of:

receiving a request to write data to a stripe unit of said selected disk; and writing said data to a stripe unit that mirrors said stripe unit of said selected disk, wherein said mirror stripe unit is located in another disk of said disk array.

4. The method as recited in claim 3 further comprising the step of:

storing a copy of said data for backup purposes.

5. The method as recited in claim 1 further comprising the steps of:

completing updating of said firmware in said selected disk; and rebuilding a stripe unit of said selected disk corresponding to a stripe tracked.

6. The method as recited in claim 5, wherein said step of rebuilding said stripe unit of said selected disk comprises the steps of:

copying data in a stripe unit in another disk of said disk array that mirrors said stripe unit of said selected disk to be rebuilt; and storing said copied data in said stripe unit of said selected disk to be rebuilt.

7. The method as recited in claim 1 further comprising the steps of:

completing updating of said firmware in said selected disk; and rebuilding one or more stripe units of said selected disk corresponding to one or more stripes tracked stripe by stripe.

8. The method as recited in claim 7 further comprising the step of:

tracking which of said one or more stripes corresponding to which of said one or more stripe units have been rebuilt.

9. The method as recited in claim 8 further comprising the step of:

receiving a request to write data to a stripe unit of said selected disk that has been rebuilt prior to completing rebuilding of said one or more stripe units of said selected disk.

10. The method as recited in claim 9 further comprising the step of:

writing said data in said stripe unit of said selected disk that has been rebuilt and in a stripe unit that is a mirror of said stripe unit of said selected disk that has been rebuilt, wherein said mirror stripe unit is located in another disk of said disk array.

11. The method as recited in claim 1 further comprising the steps of:

receiving a request to read from a stripe unit of a particular stripe of said selected disk; and performing a logical calculation on data located in other stripe units of said particular stripe.

12. The method as recited in claim 11 further comprising the step of:
transmitting a result of said logical calculation.

13. The method as recited in claim 11, wherein said logical calculation is an exclusive OR calculation.

14. The method as recited in claim 1 further comprising the steps of:
receiving a request to write data to a stripe unit of a particular stripe of said selected disk; and
generating an updated parity value stored in another stripe unit of said particular stripe.

15. The method as recited in claim 14, wherein said updated parity value is generated by performing a logical calculation on said data to be written with data located in other stripe units of said particular stripe except data located in a stripe unit storing a parity value to be updated.

16. The method as recited in claim 15, wherein said logical calculation is an exclusive OR calculation.

17. The method as recited in claim 14 further comprising the step of:
storing a copy of said data requested to be written for backup purposes.

18. The method as recited in claim 14 further comprising the step of:
tracking said particular stripe that was updated.

19. The method as recited in claim 18 further comprising the steps of:
completing updating of said firmware in said selected disk; and
rebuilding said stripe unit of said selected disk corresponding to said particular stripe that was updated.

20. The method as recited in claim 19, wherein said step of rebuilding is accomplished by performing a logical calculation on data located in other stripe units of said particular stripe.

21. A system, comprising:
an array of disks, wherein each disk in a disk array comprises a plurality of stripe units; and
a controller coupled to said array of disks, wherein said controller is configured to manage said array of disks, wherein said controller comprises:
a memory unit operable for storing a program for updating firmware in a disk in said disk array without deactivating a server coupled to said array of disks, wherein said server is configured to receive requests to access said array of disks, wherein said server is configured to forward said received requests to said controller;
a processor coupled to said memory, wherein said processor, responsive to said program, comprises:
circuitry operable for selecting a disk in said disk array, wherein said selected disk comprises said firmware to be updated;
circuitry operable for entering a degrade mode of operation for said selected disk, wherein said degrade mode of operation prevents said selected disk from receiving requests;
circuitry operable for updating said firmware in said selected disk; and
circuitry operable for tracking one or more stripes in said disk array corresponding to one or more of said plurality of stripe units of said selected disk where data in said one or more of said plurality of stripe units of said selected disk change in response to write requests to said selected disk.

22. The system as recited in claim 21, wherein said controller further comprises:
circuitry operable for receiving a request to read from a stripe unit of said selected disk; and
circuitry operable for transmitting data from a stripe unit that mirrors said stripe unit of said selected disk, wherein said mirror stripe unit is located in another disk of said disk array.

23. The system as recited in claim 21, wherein said controller further comprises:
circuitry operable for receiving a request to write data to a stripe unit of said selected disk; and
circuitry operable for writing said data to a stripe unit that mirrors said stripe unit of said selected disk, wherein said mirror stripe unit is located in another disk of said disk array.

24. The system as recited in claim 23, wherein said controller further comprises:
a non-volatile cache coupled to said processor, wherein said non-volatile cache is configured to store a copy of said data for backup purposes.

25. The system as recited in claim 21, wherein said controller further comprises:
circuitry operable for completing updating of said firmware in said selected disk; and
circuitry operable for rebuilding a stripe unit of said selected disk corresponding to a stripe tracked.

26. The system as recited in claim 25, wherein said circuitry operable for rebuilding said stripe unit of said selected disk comprises:
circuitry operable for copying data in a stripe unit in another disk of said disk array that mirrors said stripe unit of said selected disk to be rebuilt; and
circuitry operable for storing said copied data in said stripe unit of said selected disk to be rebuilt.

27. The system as recited in claim 21, wherein said controller further comprises:
circuitry operable for completing updating of said firmware in said selected disk; and
circuitry operable for rebuilding one or more stripe units of said selected disk corresponding to one or more stripes tracked stripe by stripe tracked.

28. The system as recited in claim 27, wherein said controller further comprises:
circuitry operable for tracking which of said one or more stripes corresponding to which of said one or more stripe units have been rebuilt.

29. The system as recited in claim 28, wherein said controller further comprises:
circuitry operable for receiving a request to write data to a stripe unit of said selected disk that has been rebuilt prior to completing rebuilding of said one or more stripe units of said selected disk.

30. The system as recited in claim 29, wherein said controller further comprises:
circuitry operable for writing said data in said stripe unit of said selected disk that has been rebuilt and in a stripe unit that is a mirror of said stripe unit of said selected disk that has been rebuilt, wherein said mirror stripe unit is located in another disk of said disk array.

31. The system as recited in claim 21, wherein said controller further comprises:
circuitry operable for receiving a request to read from a stripe unit of a particular stripe of said selected disk; and
circuitry operable for performing a logical calculation on data located in other stripe units of said particular stripe.

32. The system as recited in claim 31, wherein said controller further comprises:
   circuitry operable for transmitting a result of said logical calculation.

33. The system as recited in claim 31, wherein said logical calculation is an exclusive OR calculation.

34. The system as recited in claim 21, wherein said controller further comprises:
   circuitry operable for receiving a request to write data to a stripe unit of a particular stripe of said selected disk; and
   circuitry operable for generating an updated parity value stored in another stripe unit of said particular stripe.

35. The system as recited in claim 34, wherein said updated parity value is generated by performing a logical calculation on said data to be written with data located in other stripe units of said particular stripe except data located in a stripe unit storing a parity value to be updated.

36. The system as recited in claim 35, wherein said logical calculation is an exclusive OR calculation.

37. The system as recited in claim 34, wherein said controller further comprises:
   a non-volatile cache coupled to said processor, wherein said non-volatile cache is configured to store a copy of said data requested to be written for backup purposes.

38. The system as recited in claim 34, wherein said controller stores a copy of said data requested to be written in a special area in a limited number of other disks of said disk array.

39. The system as recited in claim 34, wherein said controller further comprises:
   circuitry operable for tracking said particular stripe that was updated.

40. The system as recited in claim 39, wherein said controller further comprises:
   circuitry operable for completing updating of said firmware in said selected disk; and
   circuitry operable for rebuilding said stripe unit of said selected disk corresponding to said particular stripe that was updated.

41. The system as recited in claim 40, wherein said circuitry operable for rebuilding is accomplished by performing a logical calculation on data located in other stripe units of said particular stripe.

42. A system, comprising:
   means for selecting said disk in said disk array, wherein said selected disk comprises said firmware to be updated, wherein each disk in said disk array comprises a plurality of stripe units;
   means for entering a degrade mode of operation by said selected disk, wherein said degrade mode of operation prevents said selected disk from receiving requests;
   means for updating said firmware in said selected disk; and
   means for tracking one or more stripes in said disk array corresponding to one or more of said plurality of stripe units of said selected disk where data in said one or more of said plurality of stripe units of said selected disk change in response to write requests to said selected disk.

43. The system as recited in claim 42 further comprises:
   means for receiving a request to read from a stripe unit of said selected disk; and
   means for transmitting data from a stripe unit that mirrors said stripe unit of said selected disk, wherein said mirror stripe unit is located in another disk of said disk array.

44. The system as recited in claim 42 further comprises:
   means for receiving a request to write data to a stripe unit of said selected disk; and
   means for writing said data to a stripe unit that mirrors said stripe unit of said selected disk, wherein said mirror stripe unit is located in another disk of said disk array.

45. The system as recited in claim 44 further comprises:
   means for storing a copy of said data for backup purposes.

46. The system as recited in claim 42 further comprises:
   means for completing updating of said firmware in said selected disk; and
   means for rebuilding a stripe unit of said selected disk corresponding to a stripe tracked.

47. The system as recited in claim 46, wherein said means for rebuilding said stripe unit of said selected disk comprises:
   means for copying data in a stripe unit in another disk of said disk array that mirrors said stripe unit of said selected disk to be rebuilt; and
   means for storing said copied data in said stripe unit of said selected disk to be rebuilt.

48. The system as recited in claim 42 further comprises:
   means for completing updating of said firmware in said selected disk; and
   means for rebuilding one or more stripe units of said selected disk corresponding to one or more stripes tracked stripe by stripe.

49. The system as recited in claim 48 further comprises:
   means for tracking which of said one or more stripes corresponding to which of said one or more stripe units have been rebuilt.

50. The system as recited in claim 49 further comprises:
   means for receiving a request to write data to a stripe unit of said selected disk that has been rebuilt prior to completing rebuilding of said one or more stripe units of said selected disk.

51. The system as recited in claim 50 further comprises:
   means for writing said data in said stripe unit of said selected disk that has been rebuilt and in a stripe unit that is a mirror of said stripe unit of said selected disk that has been rebuilt, wherein said mirror stripe unit is located in another disk of said disk array.

52. The system as recited in claim 42 further comprises:
   means for receiving a request to read from a stripe unit of a particular stripe of said selected disk; and
   means for performing a logical calculation on data located in other stripe units of said particular stripe.

53. The system as recited in claim 52 further comprises:
   means for transmitting a result of said logical calculation.

54. The system as recited in claim 52, wherein said logical calculation is an exclusive OR calculation.

55. The system as recited in claim 42 further comprises:
   means for receiving a request to write data to a stripe unit of a particular stripe of said selected disk; and
   means for generating an updated parity value stored in another stripe unit of said particular stripe.

56. The system as recited in claim 55, wherein said updated parity value is generated by performing a logical calculation on said data to be written with data located in other stripe units of said particular stripe except data located in a stripe unit storing a parity value to be updated.

57. The system as recited in claim 56, wherein said logical calculation is an exclusive OR calculation.

58. The system as recited in claim 55 further comprises:
   means for storing a copy of said data requested to be written for backup purposes.

59. The system as recited in claim 55 further comprises:
means for tracking said particular stripe that was updated.

60. The system as recited in claim 59 further comprises:
means for completing updating of said firmware in said selected disk; and
means for rebuilding said stripe unit of said selected disk corresponding to said particular stripe that was updated.

61. The system as recited in claim 60, wherein said means for rebuilding is accomplished by performing a logical calculation on data located in other stripe units of said particular stripe.

62. A computer program product embodied in a machine readable medium for updating firmware in a disk in a disk array without deactivating a server coupled to said disk array comprising the programming steps of:
selecting said disk in said disk array, wherein said selected disk comprises said firmware to be updated, wherein each disk in said disk array comprises a plurality of stripe units;
entering a degrade mode of operation by said selected disk, wherein said degrade mode of operation prevents said selected disk from receiving requests;
updating said firmware in said selected disk; and
tracking one or more stripes in said disk array corresponding to one or more of said plurality of stripe units of said selected disk where data in said one or more of said plurality of stripe units of said selected disk change in response to write requests to said selected disk.

63. The computer program product as recited in claim 62 further comprising the programming steps of:
receiving a request to read from a stripe unit of said selected disk; and
transmitting data from a stripe unit that mirrors said stripe unit of said selected disk, wherein said mirror stripe unit is located in another disk of said disk array.

64. The computer program product as recited in claim 62 further comprising the programming steps of:
receiving a request to write data to a stripe unit of said selected disk; and
writing said data to a stripe unit that mirrors said stripe unit of said selected disk, wherein said mirror stripe unit is located in another disk of said disk array.

65. The computer program product as recited in claim 64 further comprising the programming step of:
storing a copy of said data for backup purposes.

66. The computer program product as recited in claim 62 further comprising the programming steps of:
completing updating of said firmware in said selected disk; and
rebuilding a stripe unit of said selected disk corresponding to a stripe tracked.

67. The computer program product as recited in claim 66, wherein said programming step of rebuilding said stripe unit of said selected disk comprises the programming steps of:
copying data in a stripe unit in another disk of said disk array that mirrors said stripe unit of said selected disk to be rebuilt; and
storing said copied data in said stripe unit of said selected disk to be rebuilt.

68. The computer program product as recited in claim 62 further comprising the programming steps of:
completing updating of said firmware in said selected disk; and
rebuilding one or more stripe units of said selected disk corresponding to one or more stripes tracked stripe by stripe.

69. The computer program product as recited in claim 68 further comprising the programming step of:
tracking which of said one or more stripes corresponding to which of said one or more stripe units have been rebuilt.

70. The computer program product as recited in claim 69 further comprising the programming step of:
receiving a request to write data to a stripe unit of said selected disk that has been rebuilt prior to completing rebuilding of said one or more stripe units of said selected disk.

71. The computer program product as recited in claim 70 further comprising the programming step of:
writing said data in said stripe unit of said selected disk that has been rebuilt and in a stripe unit that is a mirror of said stripe unit of said selected disk that has been rebuilt, wherein said mirror stripe unit is located in another disk of said disk array.

72. The computer program product as recited in claim 62 further comprising the programming steps of:
receiving a request to read from a stripe unit of a particular stripe of said selected disk; and
performing a logical calculation on data located in other stripe units of said particular stripe.

73. The computer program product as recited in claim 72 further comprising the programming step of:
transmitting a result of said logical calculation.

74. The computer program product as recited in claim 72, wherein said logical calculation is an exclusive OR calculation.

75. The computer program product as recited in claim 72 further comprising the programming steps of:
receiving a request to write data to a stripe unit of a particular stripe of said selected disk; and
generating an updated parity value stored in another stripe unit of said particular stripe.

76. The computer program product as recited in claim 75, wherein said updated parity value is generated by performing a logical calculation on said data to be written with data located in other stripe units of said particular stripe except data located in a stripe unit storing a parity value to be updated.

77. The computer program product as recited in claim 76, wherein said logical calculation is an exclusive OR calculation.

78. The computer program product as recited in claim 75 further comprising the programming step of:
storing a copy of said data requested to be written for backup purposes.

79. The computer program product as recited in claim 75 further comprising the programming step of:
tracking said particular stripe that was updated.

80. The computer program product as recited in claim 79 further comprising the programming steps of:
completing updating of said firmware in said selected disk; and
rebuilding said stripe unit of said selected disk corresponding to said particular stripe that was updated.

81. The computer program product as recited in claim 80, wherein said programming step of rebuilding is accomplished by performing a logical calculation on data located in other stripe units of said particular stripe.

* * * * *